H. A. BLOOMQUIST.
CARRIER FOR BOTTLES.
APPLICATION FILED MAR. 7, 1921.

1,407,630.

Patented Feb. 21, 1922.

Witnesses
Geo L Lawrence
Arthur C. Wright

Inventor
Helmer A. Bloomquist
By Chas. P. Tillman.
Attorney

UNITED STATES PATENT OFFICE.

HELMER A. BLOOMQUIST, OF MANISTEE, MICHIGAN.

CARRIER FOR BOTTLES.

1,407,630.

Specification of Letters Patent.  Patented Feb. 21, 1922.

Application filed March 7, 1921. Serial No. 450,141.

*To all whom it may concern:*

Be it known that I, HELMER A. BLOOMQUIST, a subject of the King of Sweden, residing at Manistee, in the county of Manistee and State of Michigan, have invented certain new and useful Improvements in a Carrier for Bottles, of which the following is a specification.

This invention relates to improvements in devices to be used for carrying bottles and the like, from one place to another, and while it is more particularly intended for detachable engagement with milk bottles, and for safely carrying them when filled, from milk depots, groceries, delicatessens, and other places, yet it is applicable for use in carrying fruit jars and other containers having relatively large mouths surrounded by an annular flange or bead.

The invention consists in certain peculiarities of the construction, novel arrangement and combination of the parts thereof as will be hereinafter more fully set forth and specifically claimed.

The principal object of the invention is to provide a handle grasping device for milk bottles and the like, of such construction, arrangement and operation of its parts, that it can be instantly attached to the neck of a bottle or container, in such a manner that the same can be safely carried by the handle of the device, without contact, by the hands, with the bottle, and which can be readily and quickly disengaged or removed from the container.

Another object is to provide a carrier for bottles and the like, which shall be extremely simple and inexpensive in construction, strong, durable and adapted for bottles of different sizes, or those differing somewhat in the diameters of their necks.

Other objects and advantages of the invention will be disclosed in the following description and explanation.

In the accompanying drawing, which serves to illustrate an embodiment of the invention—

Like numeral of reference refer to corresponding parts throughout the different views of the drawing.

Figure 1:
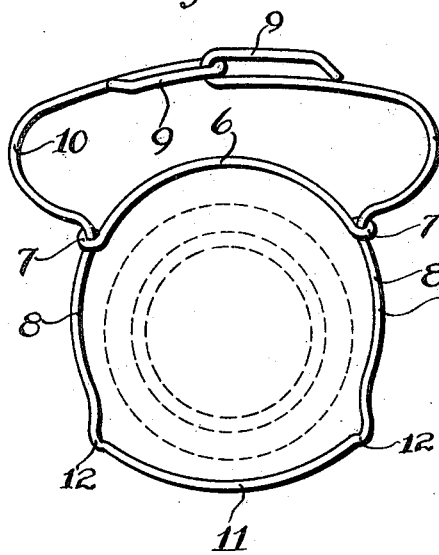
Fig. 1 is a plan view of the device showing its parts so arranged with respect to one another as to be applied to the neck of the bottle, and in the act of being so applied.

The carrier consists of but two pieces of resilient wire, one of which pieces I will designate as a handle body portion or member, which is indicated as a whole by the reference numeral 5, and the other piece as an adjustable tie piece or member 6 which is segmental in shape and has at each of its ends a loop or eye 7 for slidable engagement with the side members 8 of the body portion 5 of the device. This body portion, as shown, comprises a pair of spaced side members 8, each of which is provided at its upper portion with an elongated loop 9, which loops interlock with one another as will be clearly understood by reference to the drawing, and are extended inwardly from outwardly disposed bends 10 with which each of the members 8 is provided in its upper portion. These outward bends and loops 9 form a handle portion for the carrier as will be readily understood. At their lower ends the side members 8 are connected by a curved portion 11 which is integral with the members 8 and lies in a plane at substantially right angles thereto as will be clearly seen in Fig. 3 of the drawing, in which figure, as well as in Fig. 2, it will be observed that at the juncture of the member or portion 11 with the side members 8, the member 11 is provided with bends 12 which depend from the side pieces and co-act with the loops or eyes 7 of the member 6 to lock the device in about the position shown in Fig. 3 on the neck of the bottle.

Figure 2:
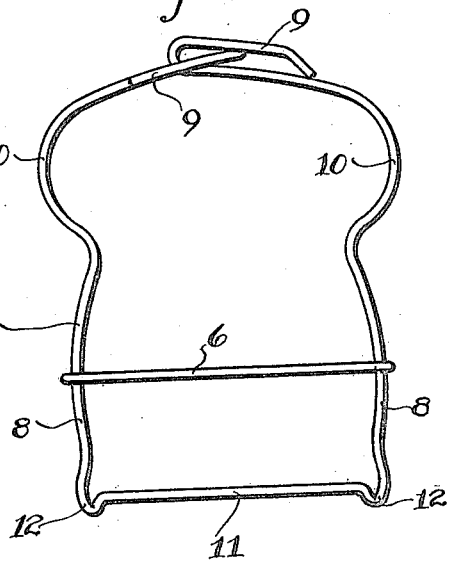
Fig. 2 is a detached view in side elevation of the device showing the parts differently positioned.
Figure 3:
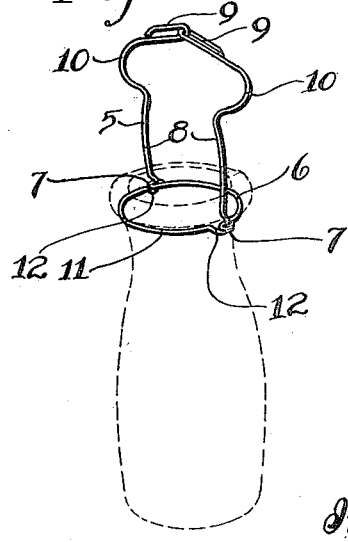
Fig. 3 is a perspective view showing the carrier in engagement with the neck of a bottle and the parts of the device in the positions they will occupy when the bottle is ready to be carried thereby.

It will be observed in Figs. 1 and 2, that the members 8 are outwardly bowed between the lower ends of the bends 10 and the bends 12, thus causing the member 6 to be retained in about the position shown in Fig. 1 when it is desired to place the device over the mouth of the bottle to which it is to be applied. When this has been done, the ends of the member 6 may be grasped by the finger and thumb of one hand, when by pulling the handle upwardly and pressing the same in a direction away from the member 6, the said member will be caused to engage the bends or loops 12 in the side members 8, thus locking the device on the bottle below the annular bead or flange on the neck thereof.

When in this position, it is manifest that the hand of the person carrying the bottle can be placed in the handle comprising the loops 9 and bent portions 10 and thus carry the bottle without the hand coming in contact therewith and in a very safe and secure manner.

To detach the device from the bottle, the movements of the parts should be reversed, which will cause the same to occupy about the position shown in Fig. 1, when it is apparent that the device may be lifted from the bottle. As the device is made up of wire which possesses considerable resiliency, and as the loops 9 interlockingly engage each other for sliding movement, it is apparent that the device is adapted for bottles varying somewhat in sizes or in the diameters of their necks.

Having thus fully described my invention, what I claim as new and desire to secure by Letters Patent is—

1. A carrier for bottles and the like, consisting of a handled body portion having spaced side members having inter-engaging loops slidably connected together at one of their ends and united at their other ends by a curved member located in a plane at substantially a right angle thereto, said curved member having at its junctures with the side members depending bends, and a curved tie member slidably mounted on said side members and adapted for engagement with said bends.

2. A carrier for bottles and the like, consisting of a handled body portion having spaced side members slidably and interlockingly connected together at one of their ends and united at their other ends by a curved member located in a plane at substantially a right angle thereto, said side members having in their upper portions outwardly extended bends and below said bends provided with outwardly bowed portions, said curved member having at its juncture with the side members depending bends, and a curved tie member slidably mounted on said side members and adapted for engagement with the last named bends for locking the device in position on a bottle.

HELMER A. BLOOMQUIST.